US010878692B2

(12) United States Patent
Sallas et al.

(10) Patent No.: US 10,878,692 B2
(45) Date of Patent: Dec. 29, 2020

(54) METHOD OF PAIRING A REMOTE CONTROL

(71) Applicant: Comcast Cable Communications, LLC, Philadelphia, PA (US)

(72) Inventors: Michael Sallas, Radnor, PA (US); Ross Gilson, Philadelphia, PA (US); Mariel Sabraw, Philadelphia, PA (US); Jonathan Palmatier, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/253,975

(22) Filed: Jan. 22, 2019

(65) Prior Publication Data

US 2019/0392705 A1 Dec. 26, 2019

Related U.S. Application Data

(63) Continuation of application No. 15/630,822, filed on Jun. 22, 2017, now Pat. No. 10,223,908, which is a continuation of application No. 14/708,937, filed on May 11, 2015, now Pat. No. 9,721,466.

(60) Provisional application No. 62/073,741, filed on Oct. 31, 2014.

(51) Int. Cl.
*H04B 10/00* (2013.01)
*G08C 23/04* (2006.01)
*G08C 17/02* (2006.01)

(52) U.S. Cl.
CPC ............ *G08C 23/04* (2013.01); *G08C 17/02* (2013.01); *G08C 2201/20* (2013.01)

(58) Field of Classification Search
CPC .. H04B 10/1123; H04B 10/1143; H08C 23/04
See application file for complete search history.

(56) References Cited

U.S. PATENT DOCUMENTS

| | | | | |
|---|---|---|---|---|
| 7,123,242 B1* | 10/2006 | Henty | G06F 3/021 345/169 |
| 9,721,466 B2 | 8/2017 | Sallas et al. | |
| 2013/0093962 A1* | 4/2013 | Bruhn | G08C 17/02 348/734 |
| 2013/0293359 A1* | 11/2013 | Innes | G08C 17/02 340/10.5 |
| 2014/0273844 A1 | 9/2014 | Castillo et al. | |
| 2015/0271432 A1* | 9/2015 | Muth | H04N 5/44 348/552 |
| 2016/0196740 A1* | 7/2016 | Park | G08C 17/02 340/12.28 |

* cited by examiner

*Primary Examiner* — Dzung D Tran
(74) *Attorney, Agent, or Firm* — Banner & Witcoff, Ltd.

(57) ABSTRACT

Systems, methods, and apparatus for device pairing are described. A first device may transmit one or more codes to a second device via a first protocol. The second device may prioritize the one or more codes. After receiving the one or more codes, the devices may initiate automated pairing. After concluding the automated pairing, the devices may communicate via a second protocol.

20 Claims, 4 Drawing Sheets

METHOD OF PAIRING A REMOTE CONTROL

RELATED APPLICATION DATA

This application is a continuation of U.S. application Ser. No. 15/630,822 filed Jun. 22, 2017, and entitled "Method of Pairing a Remote Control", which is a continuation of U.S. application Ser. No. 14/708,937, now U.S. Pat. No. 9,721,466, filed May 11, 2015 and entitled "Method of Pairing a Remote Control", that claims priority to U.S. Application No. 62/073,741 filed on Oct. 31, 2014, which is entirely incorporated herein by reference.

BACKGROUND

Current methods of pairing and validating a remote control device with a target device can be complicated and/or difficult for a user to remember. The flexibility offered by remote control pairing remains beneficial, though, so there remains an ever-present need for improved and simplified ways to pair a remote control device with a target device.

SUMMARY

The following summary is for illustrative purposes only, and is not intended to limit or constrain the detailed description.

Some features described herein relate to operating a plurality of devices (e.g., electronically controllable devices) using an existing remote control device and wireless technology, wherein the remote control device is automatically paired with a controllable device without requiring significant user interaction. To achieve this, the controllable devices may be equipped with receivers configured to receive communication signals from a remote control device. Other aspects of this disclosure relate to a remote control device having a transmission device (e.g., an infrared transmitter, radio frequency (RF) transmitter, visible light communication transmitter, laser transmitter, etc.), and configured to transmit data, such as IR ghost codes, to a target device to automatically initiate a discovery and pairing process. Other aspects of the present disclosure relate to initiating a pairing time window in which a remote control device and/or a target device may exchange certain pairing information, such as auto-pairing discovery requests and/or auto-pairing discovery responses.

Still other aspects of this disclosure relate to determining whether to automatically pair a remote control device with a particular target device. In an exemplary embodiment of the present disclosure, this may be achieved, in part, by a target device determining whether various parameters of an auto-pairing discovery request transmitted by a remote control device correspond to IR ghost codes previously received by and/or stored at the target device. Further aspects of this disclosure relate to a remote control device attempting a predetermined number of successful auto-pairing discovery operations prior to initiating a pairing validation process. In another aspect, the target device may be configured to transmit data to the remote control device indicating one or more configurable parameters for completing the auto-pairing discovery operation and pairing process. In yet another aspect, the target device may transmit data to the remote control device for adjusting one or more of the configurable parameters.

In other aspects of the present disclosure a remote control device operating in an IR mode (e.g., transmitting operational commands to a target device via IR transmissions) may periodically transmit specific IR codes to a target device in an attempt to initiate an RF pairing. The remote control device may transmit one or more RF auto-pairing discovery requests to auto-pairing enabled (or capable) target devices. Auto-pairing capable target devices receiving the auto-pairing discovery request within a threshold period of time after receiving a specified IR code (e.g., within an auto-pairing time window) may subsequently respond to the RF discovery request and attempt to pair with the remote control device.

To improve the accuracy this method is repeated a few times to make sure the same one target responds to the auto pairing request, before pairing is actually completed.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
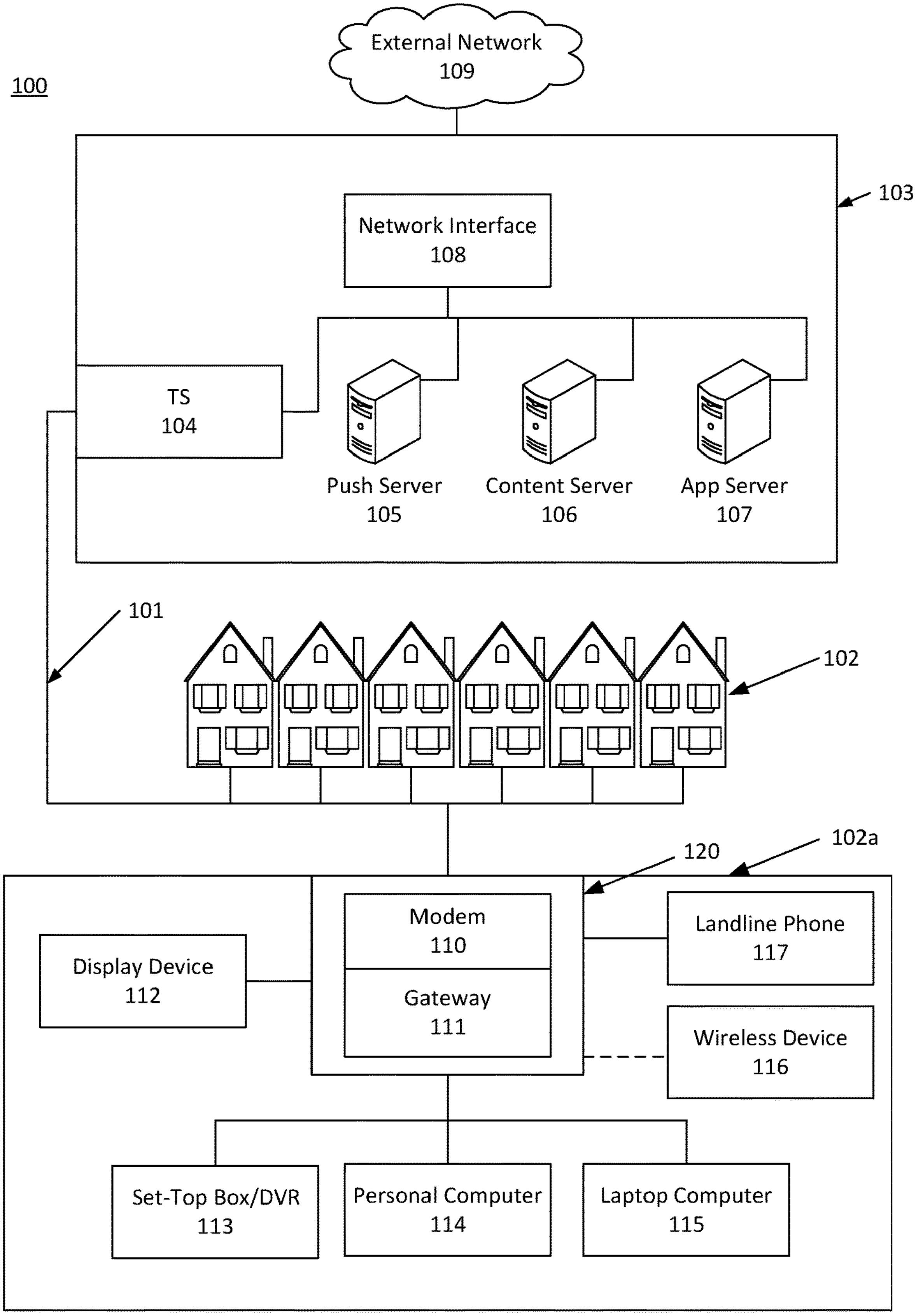
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that may be configured to detect such notifications). The local office 103 may also include a content server 106. The content server 106 may be one or more computing devices that may be configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, application server 107 may be responsible for collecting television program listings information and generating a data download for electronic program guide listings. In other aspects of the present disclosure, application server 107 may be responsible for monitoring user viewing habits and collecting that information for use in selecting advertisements. In other aspects of the present disclosure, application server 107 may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102*a*, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device (e.g., gateway 111). The modem 110 may be connected to, or be a part of, the gateway 111. The gateway 111 may be a computing device that communicates with the modem(s) 110 to allow one or more other devices in the premises 102*a*, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102*a*, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
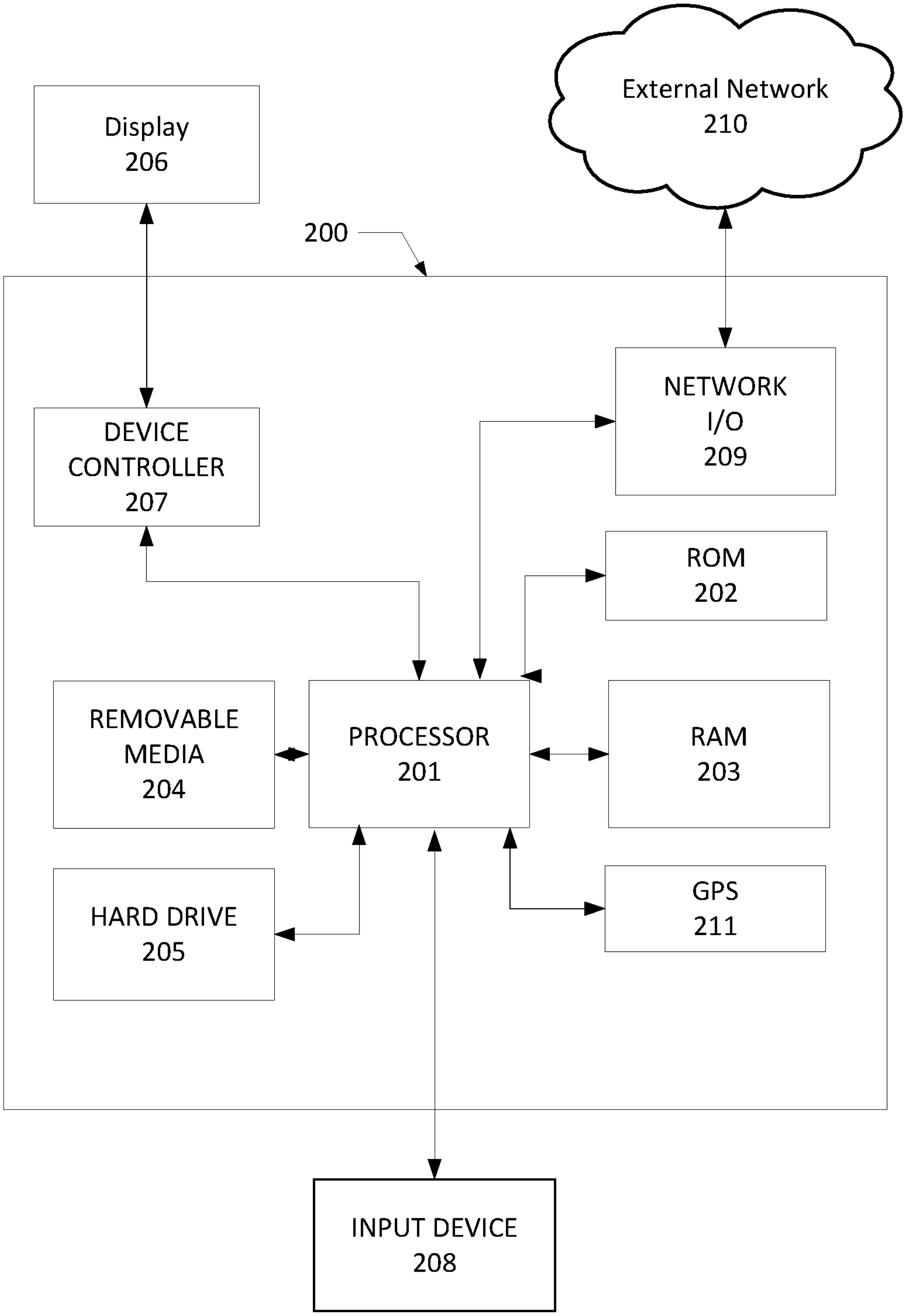
FIG. 2 illustrates an example computing device and hardware configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

FIG. 2 is an example computing device having a hardware and/or software configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
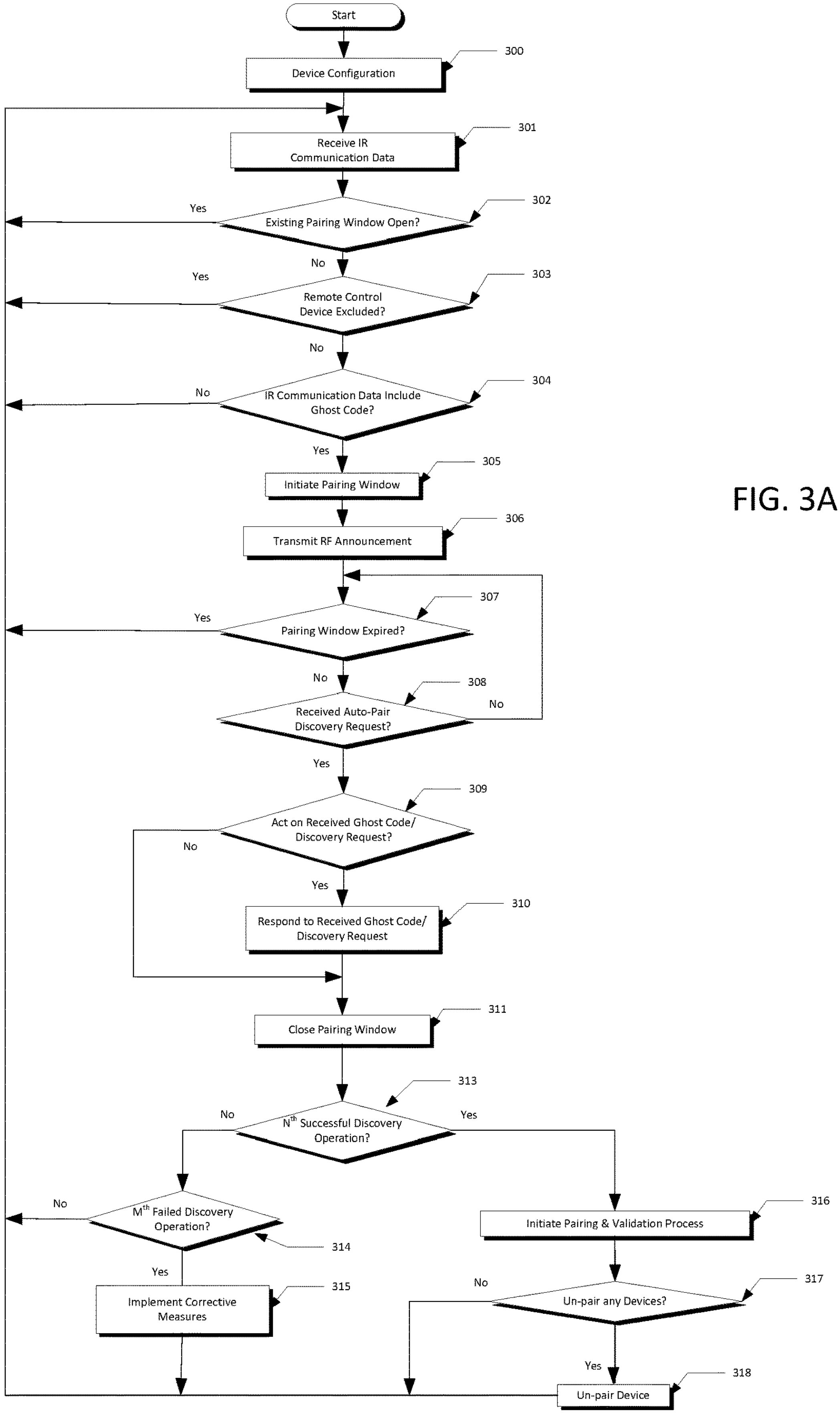
FIG. 3A illustrates an exemplary flow chart of a pairing and device communication process in accordance with one or more aspects of the present disclosure.

FIG. 3A illustrates an example method of automatically pairing a target device with a remote control device according to one or more embodiments of the disclosure that may be performed by any desired computing device, such as computing device 200, the gateway 111, the STB/DVR 113, etc. In the FIG. 3A example, a user may be attempting to pair a remote control device with an electronically controllable device (e.g., gateway 111, the STB/DVR 113, garage door opener, home security system controller, etc.) capable of receiving IR and RF transmissions and communicating data via RF.

Beginning at step 300 an initial configuration of the target device (e.g., electronically controllable target device) may be performed. This initial configuration may include a variety of actions. For example, during step 300, the target device may be configured to electronically communicate with one or more computing devices. The configuration at step 300 may include establishing the parameters and conditions by which the target device may receive information from other devices, such as a remote control device. For example, as will be discussed in more detail below, the target device may be configured to complete a predetermined number of successful auto-pairing discovery operations with a remote control device before initiating the pairing and validation process. As another example, the target device may be configured to attempt a predetermined number of auto-pairing discovery operations with a remote control device before adjusting an operational mode of the target device. An auto-pairing discovery operation may include transmitting, from a remote control device to a target device, IR codes and the exchange of auto-pairing discovery requests and responses between the remote control device and the target device prior to the initiation of a pairing and validation process.

In other embodiments, the configuration step may include configuring and/or programming the target device (e.g., by the manufacturer) to be capable of performing particular sets of operations and functions. For example, the target device may be configured to store in memory a device configuration software application. The application may provide the user with a device configuration interface that may include a series of menus and options for configuring the target device, or in some instances the remote control device. For example, the device configuration interface may provide a menu for configuring one or more of the parameters and conditions, noted above, by which the target device may receive information from other devices.

The initial configuration may also include configuring the target device to transmit and/or receive information from other devices using various communication modes, such as near field communication ("NFC"), IR, RF, Wi-Fi, and/or other communication methods. Additionally or alternatively, the initial configuration may also include configuring the target device to request and/or receive extended display identification data ("EDID") or enhanced extended display identification data (E-EDID) from the display device to which it is operatively connected, such as display device 112. For example, the target device may be configured to request data indicating the name of the manufacturer that manufactured the display device that is operatively connected to the target device.

In some embodiments, device specific information (e.g., model type, etc.) may be obtained via device fingerprinting (e.g., collecting information about the remote computing device for the purpose of identification). For example, the system may collect information concerning the remote computing device (such as how the device reacts to particular CEC commands, which commands are supported by the device, which errors (if any) are reported back in response to particular commands and/or the amount of time it takes for the device to respond to particular commands) in order to process and determine additional details relating to the remote computing device.

At step 301, the target device may receive communication data from a remote control device. For example, the remote control device may transmit data to the target device via a transmission device (e.g., an IR transmitter). In some embodiments, the data transmitted by the remote control device may include various types of information, such as pairing information, information identifying the transmitting remote control device, operational commands and the like. For example, the target device may receive information identifying the model and/or type of the remote control device. As yet another example, the target device may receive operational commands from the remote control device via an IR transmission. As another example, the target device may receive a database or list of manufacturer codes stored on the remote control device. The target device may be configured to sort and/or prioritize the codes associated with each device manufacturer. For example, the target device may prioritize the manufacturer codes into a plurality of tiers based on various factors, including but not limited to, popularity, geographic location, size, etc. In some examples, the target device may prioritize the manufacturer codes in each of the plurality of tiers based on a particular factor (e.g., popularity). In other embodiments, as will be explained in more detail below, such information may be transmitted from the remote control device to the target device in an RF transmission along with and/or subsequent to an RF pairing request.

In some embodiments, the target device may receive EDID (or E-EDID) data from a device operatively connected to the target device, e.g., a display device. In some of these embodiments, the EDID (or E-EDID) data may contain an identifier for the manufacturer of the device that is operatively connected to the target device. The target device may compare the manufacturer identifier within the EDID (or E-EDID) data with the database of manufacturer codes retrieved from the remote control device. In some embodiments, the target device may determine whether the manufacturer identified within the EDID (or E-EDID) data corresponds to one of the manufacturer codes retrieved from the remote control device. For example, the target device may determine whether the manufacturer identified within the EDID (or E-EDID) data corresponds to a manufacturer identified in a highest tier of manufacturer codes (e.g., most popular manufactures). The target device may begin a loop where it compares each manufacture code in the highest tier of manufacturer codes to the manufacturer identified within the EDID (or E-EDID) data. For example, the target device may compare a first (e.g., the most popular) manufacturer code in the highest tier of manufacturer codes to the manufacturer identified within the EDID (or E-EDID) data, and then compare a second (e.g., the second/next most popular) manufacturer code in the highest tier of manufacturer codes.

If the target device determines that the manufacturer identified within the EDID (or E-EDID) data corresponds to a manufacturer in the highest tier of manufacturer codes, the target device may transmit the manufacturer code to the remote control device. After receiving the manufacture code from the target device, the remote control device may be configured to download IR codes associated with the manufacturer identified in the manufacturer code, and may attempt to pair with the target device using the downloaded IR codes. In some embodiments, the target device may verify the manufacturer code identified within a tier of manufacturer codes. For example, the target device may prompt a user to actuate specific buttons on the remote control device. The amount of testing performed by the user to verify a manufacturer code may correspond to the particular tier of codes associated with the manufacturer code. For instance, a manufacturer code in the first or top tier may require less testing than a manufacturer code in a second or lower tier. In one of these embodiments, the remote control device may transmit the downloaded codes to the target device along with the command signals transmitted by the remote control device in accordance with user button presses when verifying a manufacturer code.

As another example, the target device may verify the manufacturer code identified within a tier of manufacturer codes by automatically transmitting operational commands to the target device, rather than prompting the user to actuate one or more buttons on the remote control device. The target device may provide feedback data to the remote control device indicating whether the appropriate (or correct) manufacturer code in the tier of manufacturer codes has been selected.

If the target device determines that the manufacturer identified within the EDID (or E-EDID) data does not correspond to any of the manufacturers in the highest tier of manufacturer codes, the target device may determine whether the manufacturer identified within the EDID/CEC data corresponds to a manufacturer in the next (e.g., second) highest tier of manufacturer codes. For example, the target device my compare a first (e.g., the most popular) manufacturer code in the next highest tier of manufacturer codes to the manufacturer identified within the EDID (or E-EDID) data, and then compare a second (e.g., the second/next most popular) manufacturer code in the next highest tier of manufacturer codes. In other embodiments, if the target device determines that the manufacturer identified within the EDID (or E-EDID) data does not correspond to any of the manufacturers in the highest tier of manufacturer codes, the target device may prompt the user to perform a more detailed manufacturer code verification process. In still other embodiments, if the target device determines that the manufacturer identified within the EDID (or E-EDID) data does not correspond to any of the manufacturers in the highest tier of manufacturer codes, the target device may prompt the user to attempt to manually pair the remote control device with the target device.

In some aspects of the present disclosure, upon each button press of the remote control device, the target device may compare manufacturer code data transmitted from the remote control device with the manufacturer identified within EDID (or E-EDID) data received at the target device. In other aspects of the present disclosure, the target device may compare manufacturer code data transmitted from the remote control device with the manufacturer identified within EDID (or E-EDID) data received at the target device each time a user powers-on the target device.

The EDID (or E-EDID) data received by the target device may change for a variety of reasons. For example, in instances where the target device is operatively connected to the display device via an intermediary device (e.g., an audio receiver), the target device may receive EDID data from the intermediary device when the display device is powered-off or not operating. If the target device determines that the manufacturer identified within EDID (or E-EDID) data has changed and/or the manufacturer code data transmitted from the remote control device does not correspond to the manufacturer identified within EDID (or E-EDID) data, the target device may transmit a notification (or message) to the remote control device.

In some embodiments, the remote control device may initiate a pairing process in response to receiving a notification that the manufacturer identified within EDID (or E-EDID) data has changed. In other embodiments, the remote control device may be process the new EDID information to determine whether it corresponds to a recognized or previously identified device. For example, the remote control device may process the new EDID data to determine whether said data was transmitted by different display device. Additionally or alternatively, the new EDID data may be processed to determine the type of device that transmitted said data. As an example, the remote control device may process a portion of the EDID data to determine whether the device that transmitted the EDID data supports certain types of functionality (e.g., audio functionality). In this example, the remote control device may determine whether the EDID data indicates that the device that transmitted the EDID data supports advanced audio codecs. Utilizing this information, the remote control device may determine the type of device that transmitted the new EDID data. Additionally or alternatively, the remote control device may compare the new EDID data with previously received EDID data and identifiers to determine if a new display device and/or intermediary device has been coupled to the target device.

In other aspects of the present disclosure, the target device may receive consumer electronics control ("CEC") command data from a device operatively connected to the target device, e.g., a display device. In some embodiments, the CEC data may contain a power status for the target device over HDMI.

In some embodiments, the target device may receive IR code(s) transmitted from a remote control device. For example, the target device may receive an auto-pairing IR ghost code transmitted from a remote control device. In some embodiments, the auto-pairing IR ghost code may comprise IR code sequences configured to provide the target device with remote control device information, such as the model and/or type of the remote control device. In some example embodiments, the IR ghost code may include a unique identifier. The identifier may be configured to provide the target device with information indicating the particular remote control device from which it was transmitted. As will be discussed in more detail below, the target device may compare this identifier with other information received from remote control devices so as to confirm the origin of the transmitted information (e.g., to determine which remote control device transmitted the information).

In some embodiments, an auto-pairing IR ghost code(s) may be transmitted to a target device in conjunction with (e.g., immediately prior to, immediately after, or simultaneously with) command signals corresponding to a button key-press on the remote control device. The target device may store in memory the IR code(s) received during step 301. For example in some embodiments, the remote control device may be configured to transmit IR ghost codes in response to a particular button being actuated (e.g., pressed) by a user.

In some aspects of the present disclosure, a target device may initiate an auto-pairing time window. The auto-pairing time window (e.g., pairing time window) may correspond to a predetermined time period in which the target device may accept and/or respond to auto-pairing discovery requests transmitted from a remote control device. The target device may typically accept pairing requests from other various devices; however, after initiating the pairing time window, the target device may be configured to only accept auto-pairing discovery requests.

The pairing time window may last a predetermined amount of time in which the remote control device may undertake an auto-pairing discovery operation. For example, the pairing time window may last, 50 ms, 100 ms, 10 s, or any other suitable period of time such that the target device may process communication data transmitted from the remote control device during step 301. In some embodiments, the target device may start a timer (or clock) lasting the duration of the pairing time window, and upon expiration of the timer, the target device may no longer receive (or accept) auto-pairing discovery requests from remote control devices. In one of these embodiments, the target device may initiate the timer upon receiving upon receiving IR codes (e.g., auto-pairing IR ghost codes) from a remote control device. In other embodiments, the target device may receive communication data from a computing device indicating a threshold duration for a pairing time window. In one of these embodiments, the target device may receive communication data from a computing device (e.g., a remote control device) currently paired with the target device via IR, RF, or any other suitable communication method. In still other embodiments, the target device may be configured at the time of manufacture with one or more parameters indicating a duration for the pairing time window. The target device may be configured to adjust the duration of the pairing time window based on communication data received during step 301. In some aspects of the disclosure, upon expiration of the time window, the target device may set a flag (or some other indicator) indicating that the pairing time window has ended.

After receiving communication data from the remote control device, at step 302, the target device may determine whether an existing pairing time window is open. As an example, an existing time window may be open in instances where the target device has already initiated an auto-pairing process with a remote control device. At step 302, if the target device determines that an existing pairing time window is open, the method may proceed back to step 301, where the target device may wait to receive IR communication data from a remote control device. If the target device determines that an existing pairing time window is not open, the method may proceed to step 303, where the target device may determine whether the remote control device transmitting the IR communication data received during step 301 is an excluded device.

A remote control device may be identified as an excluded device by the target device for various reasons. For example, remote control devices not configured to operate and/or pair with the target device may be identified as an excluded device. As another example a remote control device may be identified as an excluded device after a predetermined number of failed pairing attempts with the target device. In some embodiments, the target device may store in a database a device identifier for the one or more excluded remote control devices. In other embodiments, the target device may be configured at the time of manufacture with one or more parameters indicating a list of excluded remote control devices. In some aspects of the present disclosure, during step 303, the target device may analyze IR communication data received during step 301 to identify the remote control device transmitting the data. The target device may compare data indicating an identifier for the remote control device transmitting the communication data with data indicating identifiers for one or more excluded remote control devices. In other embodiments, the target device may determine whether a remote control device is an excluded device after receiving an auto-pairing discovery request from the remote control device, as will be explained in further detail with respect to 308.

At step 303, if the target device determines that the remote control device transmitting the communication data received during step 301 is an excluded device, the method may proceed back to step 301, where the target device may wait to receive IR communication data from a remote control device. If the target device determines that the remote control device transmitting the communication data received during step 301 is not an excluded device, the method may proceed to step 304.

At step 304, the target device may determine whether the IR communication data received during step 301 includes an auto-pairing IR ghost code. As discussed above, a remote control device may transmit an auto-pairing IR ghost code to a target device in furtherance of initiating an auto-pairing process between the remote control device and the target device. However, a remote control device may also transmit other data via IR transmission to the target device, such as operational commands (e.g., channel up, channel down, volume up, etc.). Accordingly, the target device may process the IR communication data transmitted from a remote control device to determine the presence of an auto-pairing IR ghost code. If the target device does not detect the presence of an auto-pairing IR ghost code in the IR communication data received during step 301, the method may proceed back to step 301. If the target device detects the presence of an auto-pairing IR ghost code in the IR communication data received during step 301, the method may proceed to step 305.

At step 305, the target device may initiate an auto-pairing time window. As discussed above, the pairing time window may correspond to an allotted time period for the target device to complete an auto-pairing discovery operation with a remote control device. In some embodiments, during step 305, the target device may start a timer (or clock) lasting the duration of the pairing time window. In some of these embodiments, upon expiration of the timer, the target device may no longer receive (or accept) auto-pairing discovery requests from remote control devices.

At step 306, the target device may transmit an RF announcement or some other communication indicating receipt of an auto-pairing IR ghost code. In one example embodiment, the target device may broadcast the RF announcement to a plurality of devices. In other embodiments, the target device may transmit the RF announcement to the device which transmitted the auto-pairing IR ghost code received by the target device during step 301. In some aspects of the disclosure herein, during step 306, the target device may determine an RF channel in which to communicate with the remote control device that transmitted the auto-pairing IR ghost code. For example, the target device may transmit one or more pings on different RF channels until it receives a response from the remote control device. In some embodiments, the target device may transmit another type of response/communication (other than an RF announcement) to the target device indicating receipt of an auto-pairing IR ghost code. As will be appreciated, various types of responses or acknowledgements may be transmitted from the target device to the remote control device to confirm or indicate receipt of transmitted information without departing from the scope of the present disclosure. In other embodiments, after initiating the pairing window, the method may skip steps 306 and 307, and begin listening for an auto-pairing discovery request from a remote control device.

At step 307, the target device may determine whether the pairing time window has expired. In some embodiments the target device may determine whether a flag (or some other indicator) indicating the end of the pairing time window has been set. In other embodiments the target device may determine whether a clock or timer representing the duration of the pairing time window has expired. If the target device determines that the pairing time window has expired, the method may proceed back to step 301. If the target device determines that the pairing time window has not expired, the method may proceed to step 308.

At step 308, the target device may initiate a loop where it begins to monitor for one or more auto-pairing discovery requests transmitted by a remote control device. As discussed in more detail below, a remote control device may transmit an auto-pairing discovery request to a target device in response to receiving the RF announcement transmitted during step 306. The auto-pairing discovery request is transmitted from the remote control device to the target device as an RF communication. In some embodiments, the auto-pairing discovery request transmitted by the remote control device may include device specific information for the remote control device. For example, as noted above, the auto-pairing discovery request may provide the target device with remote control device information, such as the model and/or type of the remote control device. For instance, the discovery request may include a unique identifier configured to provide the target device with information indicating the particular remote control device from which it was transmitted. As noted above with respect to step 303, the target device may process the device specific information included in the auto-pairing discover request to determine whether the remote control device is an excluded device.

If the target device has not received an auto-pairing discovery request, the method may proceed back to step 307. If the target device receives an auto-pairing discovery request, the method may proceed to step 309. At step 309, the target device may determine whether to take any actions in response to receiving the auto-pairing IR ghost code and/or auto-pairing discovery request. In some aspects of the present disclosure, the target device may contain business logic, algorithms, or other instructions for determining whether to respond to auto-pairing IR ghost codes and/or an auto-pairing discovery requests transmitted from a remote control device. For example, if the target device determines that the remote control device that transmitted the auto-pairing IR ghost code during step 305 is not the same device that transmitted the auto-pairing discovery request received during step 308, the target device may not respond to the received auto-pairing IR ghost code and/or the auto-pairing discovery request.

As another example, if the target device determines that one or more auto-pairing discovery requests received during step 308 were transmitted from more than one remote control device the target device may not respond to the received auto-pairing discovery requests. In this example, receipt of a first and second auto-pairing discovery request during step 308 may trigger, at the target device, an indication of multiple remote control devices attempting to communicate (or auto-pair) with the target device. There are various ways in which the target device may determine if received auto-pairing discovery requests were sent from multiple remote control devices. For example, the target device may extract device-specific information (e.g., model, device type, authentication codes, other unique identifiers, etc.) from each received auto-pairing discovery request, and compare such information to determine whether the auto-pairing discovery requests were sent from multiple remote control devices. Additionally or alternatively, the target device may be configured to detect multiple remote control devices within a threshold proximity (or area) based on received auto-pairing IR ghost code(s). For example, if the target device receives two auto-pairing IR ghost codes within a certain period of time, the remote control device may determine that the two IR ghost codes were transmitted from different remote control devices based at least in part on device specific identifiers included within the transmitted information.

As noted above, there are a variety of circumstances where a target device (e.g., gateway 111) may receive auto-pairing discovery requests from multiple remote control devices. For example, in an environment where a variety of different programming content may be simultaneously displayed on a plurality of different display devices (e.g., televisions), such as in a sports bar or a gym, each display device may be connected to a particular target device (e.g., STB 113) to receive programming content. Additionally, each of the STBs in the establishment may be associated and/or paired with one or more remote control devices. In this example, one or more patrons of the establishment may unintentionally attempt to control a single target device with multiple remote control devices that may or may not be associated with that particular target device. As another example, a family of consumers may have multiple STBs and associated remote control devices in their premises. Two members of the family may unintentionally attempt to control a particular STB with separate remote control devices that may or may not have been previous paired to the target device, thus resulting in the target device receiving auto-pairing discovery requests from the multiple remote control devices operated by the family members. In other aspects of the disclosure herein, as will be discussed in more detail below, if the target device determines that one or more auto-pairing discovery requests received during step 308 were transmitted from multiple remote control devices the target device may respond to the auto-pairing discovery requests by initiating a "blackout" period.

In other aspects of the disclosure herein, the target device may determine whether to take any actions in response to receiving auto-pairing ghost codes and/or discovery requests by comparing data parameters included therein. For example, the target device may process the auto-pairing discovery request received during step 308 to determine whether it includes data, identifiers, or other parameters corresponding to (or referencing) the communication IR code(s) (e.g., auto-pairing IR ghost code(s)) received during step 301. The target device may extract data from the auto-pairing discovery request received during step 308, and compare this information to the auto-pairing IR ghost code(s) received during step 301. By analyzing the data, identifiers and/or other parameters included within the auto-pairing discovery request, the target device may determine whether the remote control device that transmitted the auto-pairing discovery request is the same device that transmitted the IR communication data (e.g., data payload) received during step 301. For example, if a consumer has two STBs located in the same or adjacent rooms of their home, when two users are using two different remote control devices to control two different STBs within a threshold proximity, a first STB may unintentionally receive RF transmissions (e.g., a discovery request) intended for a second STB in the same or adjacent room. In this example, the first STB, having previously received IR ghost codes from a first remote control device may subsequently receive a discovery request from the second remote control device. In this example, the first STB may attempt to correlate the auto-pairing IR ghost code to the correct remote control device after having received multiple discovery requests from different remote control devices.

Additionally or alternatively, the target device may be configured verify that it is communicating with the appropriate remote control device by exchanging authentication codes with the remote control device. In particular, the target device may be configured to receive from a remote control device a random and/or unique authentication code sent in a data packet (e.g., RF data packet) included within a first payload of a first auto-pairing discovery request. In some embodiments, the payload including the unique authentication code may be randomized for each auto-pairing discovery request transmitted from the remote control device to the target device. For example, after receiving the first payload via a first communication type (e.g., IR transmission) from the remote control device, the target device may be configured to receive additional data payloads from the remote control device. The remote control device may then transmit a second auto-pairing discovery request with the same (or similar) payload using a different communication type (e.g., RF communication). The target device may be configured to analyze the second auto-pairing discovery request and determine whether the request was transmitted from the same remote control device that also transmitted the first payload and first auto-pairing discovery request. This may be accomplished by the target device comparing the first payload and the second payload to determine whether the data payloads correspond to each other (e.g., whether the payloads include the same unique authentication code).

In other aspects of the present disclosure, the target device may be configured verify that it is communicating with the appropriate remote control device by comparing identifiers included within data transmission from the remote control device. As discussed above, an IR ghost code transmitted to the target device from a remote control device may include a unique identifier configured to provide the target device with remote control device information (e.g., model, type, etc.). In some embodiments, the target device may be configured to receive from the remote control device another random and/or unique identifier sent in a data packet (e.g., RF data packet) included within a payload of an auto-pairing discovery request. The target device may compare the identifier received in the auto-pairing discovery request with the identifier associated with the previously received auto-pairing IR ghost code to determine whether the IR ghost code and auto-pairing discovery request were transmitted from the same device.

In the example embodiments above, if the target device determines that data or parameters extracted from the auto-pairing discovery request received during step 308 do not correspond with (or reference) the auto-pairing IR ghost code received during step 301, the target device may decide not to respond to the auto-pairing discovery request, and the method may proceed to step 311. Additionally or alternatively, if the target device determines that identifier(s) extracted from the auto-pairing discovery request received during step 308 do not correspond with (or reference) the identifier in the auto-pairing IR ghost code received during step 301, the target device may decide not to respond to the auto-pairing discovery request, and the method may proceed to step 311.

In some embodiments, the target device may be configured to notify a remote control device that multiple remote control devices are attempting to simultaneously auto-pair with the target device. In some aspects of the example embodiment discussed above, during step 309, if the target device determines that the data extracted from the auto-pairing discovery request correspond with (or reference) the auto-pairing IR ghost code(s) received during step 301, the method may proceed to step 310. Similarly, if the target device determines that the data extracted from the auto-pairing discovery request received during step 308 does not exist (i.e., only one auto-pairing IR ghost code was received), the method may proceed to step 310. As will be described in more detail below, in some aspects of the present disclosure, the target device may track whether an auto-pairing discovery operation has succeeded or failed. In some example embodiments, during step 309, the target device may update a counter indicating whether a discovery operation has failed (e.g., the target device does not respond to a received auto-paring discovery request). Additionally or alternatively, the target device may update a counter indicating whether a discovery operation has succeeded.

Referring back to step 309, if the target device determines that it will not take any actions in response to receiving the auto-pairing IR ghost code and/or the auto-pairing discovery request, the method may proceed to step 311. However, as discussed above, if the target device determines that it may respond to the received ghost code and/or auto-pairing discovery request, the method may proceed to step 310, where the target device may respond to the ghost code and/or the auto-pairing discovery request. In some embodiments, during step 310, the target device may transmit an auto-pairing discovery confirmation or response to the remote control device that transmitted the auto-pairing discovery request received during step 308. In some embodiments, the target device may transmit additional information to the remote control device, such as data identifying a device type of the target device.

In other embodiments, during step 310, if the target device previously determined during step 309 that auto-pairing discovery requests were transmitted by more than one remote control device, the target device may initiate a "blackout" period where the target device may no longer respond to auto-pairing IR ghost codes or auto-pairing discovery requests sent from remote control devices. During the blackout period, the target device may attempt to terminate the auto-pairing discovery operation and pairing process with the remote control device that transmitted the auto-pairing discovery request. Since the various remote control devices attempting to communicate with the target device may not be aware of the other remote control device(s) also attempting to transmit a discovery request to the target device, the target device may wait for a certain period of time (e.g., the blackout period) before attempting to resume receiving auto-pairing IR ghost codes and discovery requests sent via RF. For example, the target device may remain in the blackout period for 10 seconds, 20 seconds, or any other suitable time period. In some embodiments, the target device may provide a notification to the user, via a display device, that the target device has initiated a blackout period. In other embodiments, the target device may provide a notification to the user via remote control vibration (e.g., haptic feedback), blinking lights, or any other suitable form of feedback to indicate that a blackout period has been initiated.

Referring back to the examples above, in the event that two users attempt to control a target device with multiple remote control devices, the target device receiving the multiple discovery requests may initiate a blackout period where the target device may no longer respond to auto-pairing IR ghost codes and/or auto-pairing discovery requests from the remote control devices. The users, who may be notified of the target device entering the blackout period, may now have to wait a threshold period of time (e.g., the blackout period) before the target device may resume accepting auto-pairing IR ghost codes and discovery requests from remote control devices. As another example, the target device may be configured to inform the remote control devices of the initiation of the blackout period, such that the remote control devices may not unnecessarily send auto-pairing IR/RF data packets (e.g., auto-pairing IR ghost codes, discovery requests, etc.), which may be transmitted to the wrong target device. In this example, the remote control devices may be configured to wait the duration of the blackout period, plus an additional buffer period before attempting to transmit auto-pairing IR ghost codes and/or discovery requests. In some embodiments, during step 310, the target device may adjust one or more of its operational modes. For example, the target device may enter a "blackout" mode where the target device may be configured to not respond to auto-pairing discovery requests sent from remote control devices. In this example, the target device may remain in the blackout mode for a predetermined period of time (e.g., the blackout period).

At step 311, the target device may close (or terminate) the pairing time window initiated during step 305. In some aspects of the present disclosure, after the pairing time window has closed the target device may no longer receive (or accept) auto-pairing discovery requests. In some embodiments, the target device may close (or terminate) the pairing time window immediately during and/or after step 308 (e.g., after an auto-pairing discovery request has been received). In some aspects of the disclosure, the target device may be configured to complete a predetermined number of successful auto-pairing discovery operations with a remote control device before attempting to initiate a pairing and validation process with the remote control device.

In some embodiments, as will be discussed in more detail with respect to FIG. 3B, the target device may receive a response form a remote control device indicating whether an auto-pairing discovery operation has succeeded or failed. In other embodiments, the target device may determine whether an auto-pairing discovery operation was a success. For example, with respect to the target device, a successful auto-pairing discovery operation may include receiving an auto-pairing IR ghost code and auto-pairing discovery request from a remote control device and transmitting a response to the received request (e.g., an auto-pairing discovery response). The auto-pairing discovery operation may be considered a failure by the target device if one or more of these steps do not occur. For example, the target device may consider an auto-pairing discovery operation a failure if the target device does not transmit an auto-pairing discovery response to the remote control device, of fails to receive an auto-pairing discovery request.

At step 313, the target device may determine whether a predetermined number of successful auto-pairing discovery operations with a remote control device have occurred (or have been attempted). The target device may need to complete a certain number of successful auto-pairing discovery operations to ensure that it has identified the appropriate (or correct) remote control device to pair with. In some embodiments, the target device may need to complete a certain number of consecutive successful auto-pairing discovery operations before attempting to auto-pair with a remote control device. For example, the target device may need to undergo three (3) consecutive successful auto-pairing discovery operations before initiating a pairing and validation process with a remote control device. The target device may be configured to complete any number of consecutive successful auto-pairing discovery operations prior to initiating a pairing and validation process without departing from the scope of the present disclosure.

In some aspects of the disclosure herein, the target device may retrieve from memory parameters indicating a number of successful auto-pairing discovery operations necessary to initiate a pairing and validation process. Additionally or alternatively, as discussed in more detail below with respect to FIG. 3B, the remote control device may retrieve from memory parameters indicating the number of consecutive successful auto-pairing discovery operations to initiate the pairing and validation process, and may transmit this information to the target device. The target device may be configured to determine whether multiple remotes are attempting to initiate a pairing relationship. By analyzing information from both the remote control device and the target device concerning the number of consecutive successful auto-pairing discovery operations necessary to attempt a pairing relationship, this may improve the target devices probability of pairing with the correct or expected remote control device. The target device may also retrieve from memory other parameters, such as a number of unsuccessful auto-pairing discovery operations permitted before a remote control device may transition from an auto-pairing mode to a standard IR mode.

The target device may be programmed at the time of manufacture with predetermined values for the one or more of the parameters discussed above. In some embodiments, the target device may transmit data to the remote control device indicating values for the one or more parameters discussed above. In one of these embodiments, the target device may transmit the parameter values to a remote control device via a response to an auto-pairing discovery request (e.g., auto-pairing discovery response). In another of these embodiments, the target device may transmit the parameter values to a remote control device within an RF announcement and/or an auto-pairing discovery response. The remote control device may be configured to extract parameter values from the auto-pairing discovery response (and/or RF announcement), and store the parameter values into memory.

In some embodiments, the target device may be configured (or remotely programmed) to modify the values associated with one or more of the parameters discussed above. For example, the target device may be configured (or remotely programmed) to adjust the number of consecutive successful auto-pairing discovery operations that must occur (or be attempted) before attempting to initiate a pairing and validation process with a remote control device. In some embodiments, the target device may be configured (or programmed) at the time of manufacture with the parameters indicating the number of consecutive successful auto-pairing discovery operations necessary before attempting to initiate a pairing and validation process with a remote control device. In some embodiments, the target device may transmit information to a target device adjusting one or more parameters of the remote control device associated with the number of necessary consecutive successful auto-pairing discovery operations to pair with the target device. As discussed above, the target device may increment a counter for each consecutive successful (or failed) auto-pairing discovery operation, and compare the value of the counter to one or more of the parameters discussed above. In some example embodiments, during step 313, the target device may update a counter indicating whether the auto-pairing discovery operation was successful.

At step 313, if the target device determines that a predetermined number of successful auto-pairing discovery operations have not been completed, the method may proceed to step 314. At step 314, the target device may determine whether a predetermined number of unsuccessful auto-pairing discovery operations have occurred (or have been attempted). In some example embodiments, the target device may determine whether a predetermined number of consecutive auto-pairing discovery operations with a remote control device have failed. In some aspects of the disclosure herein, the target device may retrieve from memory parameters indicating the number of unsuccessful auto-pairing discovery operations necessary before the target device initiates corrective measures. Additionally or alternatively, as discussed in more detail below with respect to FIG. 3B, the remote control device may retrieve from memory parameters indicating the number of unsuccessful auto-pairing discovery operations and may transmit this information to the target device. The target device may be programmed at the time of manufacture with the predetermined values for one or more of the parameters discussed above. In some embodiments, the target device may transmit data to the remote control device indicating the value for one or more of these parameters.

As discussed above, the target device may transmit parameter values to a remote control device via a response to an auto-pairing discovery request and/r=or via an RF announcement. The target device may be configured or remotely programmed to modify the values associated with one or more of these parameters. For example, the target device may be configured (or remotely programmed) to adjust the number of unsuccessful auto-pairing discovery operations with a remote control device that must occur (or be attempted) prior to taking any responsive actions and/or corrective measures. The target device may increment a counter for each consecutive failed auto-pairing discovery operation with a remote control device, and may compare the value of the counter to one or more of the parameters discussed above.

As will be discussed in more detail below, after failing a predetermined number of auto-pairing discovery operations (or failing a predetermined number of consecutive auto-pairing discovery operations) with a remote control device, the target device may be configured to perform certain responsive actions and/or corrective measures. In some example embodiments, during step 314, the target device may update a counter indicating whether the attempted auto-pairing discovery operation has failed. At step 314, if the target device determines that it has not failed the predetermined number of auto-pairing discovery operations, the method may proceed back to step 301. However, if the target device determines that it has failed the predetermined number of auto-pairing discovery operations with a remote control device, the method may proceed to step 315.

At step 315, the target device may perform one or more actions in response to failing the predetermined number of auto-pairing discovery operations. During step 315, the target device may output to a display device a message indicating that attempts to auto-pair with the remote control device have failed. The message may also include one or more options that a user may perform in response to the failed auto-pairing attempts. The target device may perform one or more actions in response to the received user input. For example, the target device may provide the user with an option to manually pair the remote control device with the target device. In this example, the target device may be configured to flag the remote control device such that it no longer attempts to auto-pair with the remote control device that transmitted the auto-pair discovery request received during step 308.

Additionally or alternatively, the target device may be configured to flag the remote control device such that the target device may only respond to manual pairing attempts from the remote control device. As another example, the target device may provide the user with an option to add the remote control device to an excluded device list. A variety of other corrective measures may be performed by the target device in response to failing to auto-pair with a remote control device without departing from the scope of the present disclosure. After one or more corrective measures have been implemented by the target device, the method may proceed back to step 301.

Referring back to step 313, if the target device determines that a predetermined number of successful auto-pairing discovery operations have been completed, the method may proceed to step 316, where the target device may automatically initiate a pairing and validation process with the target device that transmitted the auto-pairing discovery response received during step 308. At step 316, the target device may initiate a pairing and validation process with the remote control device that transmitted the auto-pairing discovery request received during step 308. The target device may exchange additional pairing and configuration information with the remote control device when attempting to establish a pairing relationship. During step 316, the target device may wait a predetermined time period for additional information to be transmitted from the remote control device. In one of these embodiments, the target device may wait for additional pairing information to be transmitted from the remote control device. In some embodiments, during the pairing process, the remote control device may transmit a pairing request to the target device to establish a temporary pairing with the target device. After receiving the pairing request from the remote control device, the target device may transmit a pairing response and other data to the remote control device.

It is to be understood that devices, such as a remote control device, may encrypt data that is transmitted to another computing device (e.g., an encrypted command signal). In addition, communication networks may require encryption of data transmitted over the network. As result, devices operating under these or other security restrictions may need to perform one or more key exchanges to communicate with other devices. For example, in some embodiments, after receiving a pairing response or confirmation signal from the target device, the remote control device may initiate a key exchange with the target device to obtain a pairing key. In some embodiments, the target device may be configured to transmit one or more pairing keys to the remote control device that transmitted the auto-pairing discovery request. In other embodiments, a shared secret could be used during the pairing processed, and hashed based on a variety of parameters such as time of day/date, MAC address, or sequence number. The shared secret could then be transmitted in the discovery request to verify whether a remote control device is authorized to operate the target device.

During step 316, the remote control device may also initiate a validation process with the target device. During the validation process, the remote control device may periodically transmit a check validation request (e.g., PING request) to the target device. After receiving the check validation request, the target device may check the result of the validation process (e.g., determine whether the validation was a success, a failure, or aborted), and transmit a check validation response to the remote control device. As will be discussed in more detail below, in some embodiments, the target device and remote control device may not undergo a pairing and validation process until a predetermined number of consecutive successful auto-pairing discovery operations have occurred (or have been attempted). Once paired, the remote control device may be configured to communicate with the target device, and may begin accepting certain RF commands from the remote control device. In some embodiments, the remote control device may be configured to communicate (e.g., exchange data) with one or more other devices that may be electronically (or wirelessly) coupled to the target device. For example, once pairing relationship has been established with the target device, the remote control device may pair with and/or control one or more other electronically controllable devices within the same wireless hub or network as the target device. In other aspects of the disclosure herein, during step 316, the target device may establish a pairing relationship with a desired remote control device using known pairing and validation methods.

At step 317, the target device may determine whether it needs to end a pairing relationship with a device. In some embodiments, the target device may output to a display device a message querying the user whether they wish to end a pairing relationship with one or more remote control devices. The target device may attempt to end a pairing relationship based on the received user input. In other embodiments, the target device may be configured to maintain pairing relationships with a predetermined number of remote control devices. If the pairing relationship created during step 316 causes the target device to exceed a threshold number of pairing relationships, the target device may terminate a pairing relationship with one of the remote control devices. If the target device determines no pairing relationships need to be terminated, the method may proceed back to step 301. If the target device determines that one or more pairing relationships need to be terminated, the method may proceed to step 318, where the target device may terminate a pairing relationship with one or more devices. During step 318, in some embodiments, the target device may output to a display device a message indicating that a pairing relationship with a device has been terminated. After the one or more devices have been un-paired (e.g., the pairing relationship with the device has been terminated), the method may proceed back to step 301.

In some aspects of the disclosure herein, the target device may be configured to periodically listen for remote control devices with which to initiate an auto-pairing process. In these embodiments, the target device may not wait to receive communication data (e.g., auto-pairing IR ghost codes) from a remote control device before attempting to automatically pair with the remote control device. As an example, when first receiving a remote control device and a target device (e.g., gateway 111 or STB 113) from a manufacturer or service provider, the user may not need to press any buttons or attempt to manually pair the target device with the remote control device. Rather, after being powered-on or connected to a power source, the target device may begin to automatically listen for a remote control device to pair with.

In some embodiments, the target device may search for remote control devices that have yet to pair with another target device and/or remote control devices that have not recently been operated by a user. This may be accomplished by the target device extracting payload data, from a received discovery request, which may indicate whether the remote control device is already paired with another device or has recently been operated by a user. For example, a remote control device may be equipped with an accelerometer, and data generated by the accelerometer may be used to indicate whether (and/or when) the remote control device has been picked up or operated by a user. Additionally, the remote control device may store in memory button presses and/or command signals that have been recently transmitted, and the time at which those signals were transmitted. The target device may analyze such data to when searching for devices (e.g., remote control devices) to pair with.

In other embodiments, after being powered-on, the remote control device may attempt to initiate an auto-pairing process with target devices by transmitting a broadcast message. Target devices capable of receiving the broadcast message and available to accept discovery requests from an un-paired remote control device may respond to the broadcast message by transmitting a unique code or sequence of codes to the remote control device. For example, a target device may respond to the broadcast message by transmitting a unique identifier to the remote control device. After a threshold period of time, the remote control device may continuously (or periodically) transmit one or more auto-pairing IR codes (e.g., auto-pairing IR ghost code) that include data referencing the unique identifier transmitted by a target device which responded to the initial broadcast message. Once an intended target device receives an auto-pairing IR code transmitted by the remote control device, the target device and the remote control device may initiate an RF pairing process as described herein.

In some aspects of the present disclosure, the user may be notified via a message or communication displayed on a display device (either on the remote control device and/or electronically coupled to the target device), that an auto-pairing process has been initiated. The target device may utilize a timer to periodically determine when to begin monitoring for remote control devices. Upon expiration of the timer, the target device may search for remote control devices to pair with. The target device may be configured to search for remote control devices to pair with every 10 minutes, 30 minutes, 60 minutes, or any other suitable time period. In some embodiments, the user may be provided with an option to adjust the duration of the timer (e.g., to adjust how often the target device may search for remote control devices to pair with). In other embodiments, the duration of the timer may be adjusted by a network administrator, by local office 103, or by any other suitable entity with access and/or permission to reconfigure the target device. For example, a service technician may have a unique location-based radio tag (or other device) that may permit the technician to adjust the duration of the timer.

Figure 3B:
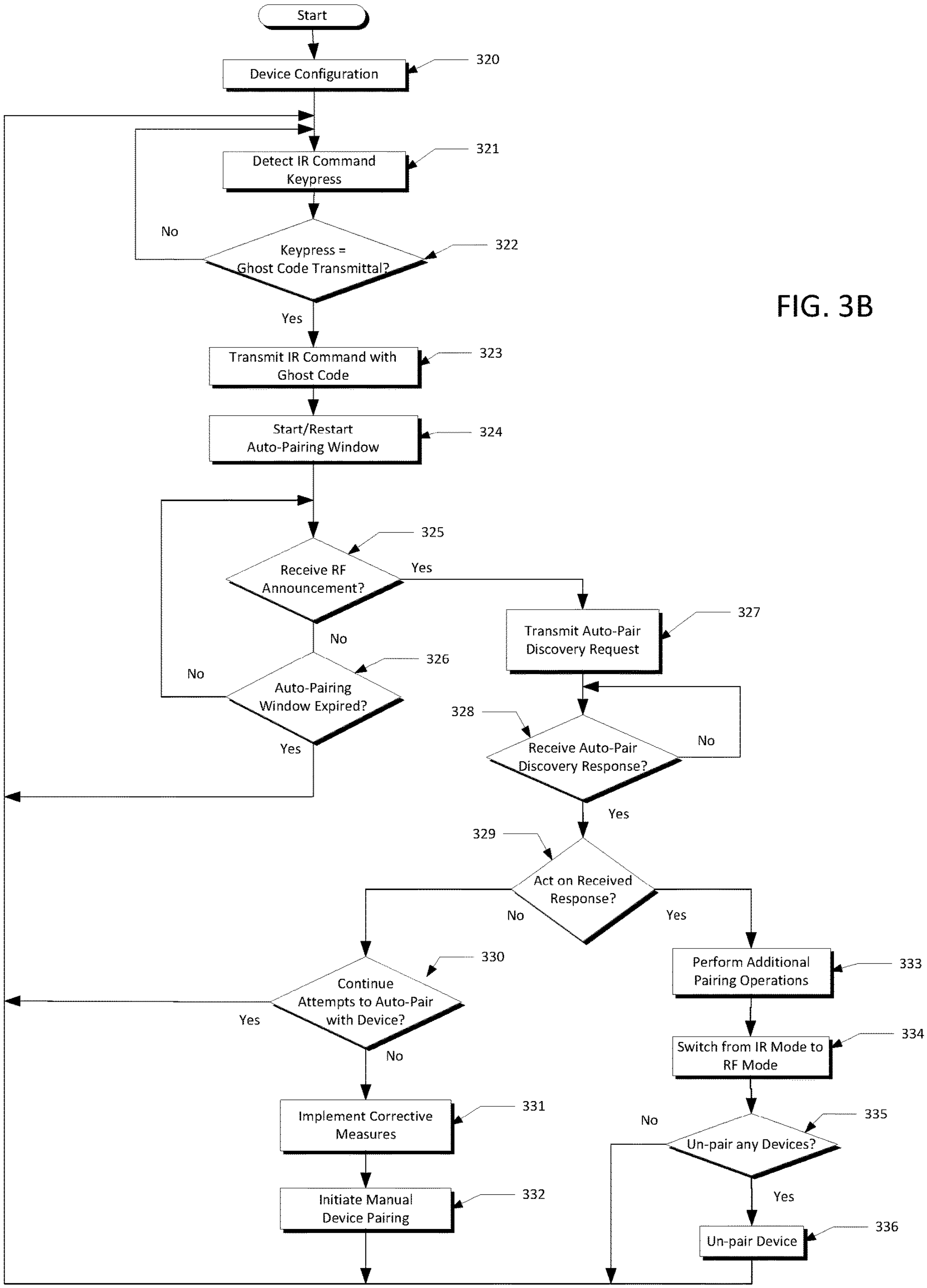
FIG. 3B illustrates an exemplary flow chart of a pairing and device communication process in accordance with one or more aspects of the present disclosure.

FIG. 3B illustrates an example method of pairing a target device with a remote control device according to one or more embodiments of the disclosure that may be performed by a remote control device having an IR transmitter and configured to transmit data via RF. In the FIG. 3B example, a user may be attempting to automatically pair a remote control device with a target device (e.g., gateway 111, STB/DVR 113, or any other suitable electronically controllable device).

At step 320, an initial configuration of the remote control device may be performed. This initial configuration may include a variety of actions. For example, during step 320, the remote control device may be configured to electronically communicate with one or more computing devices. The configuration at step 320 may include establishing the parameters and conditions by which the remote control device may receive information from other devices, such as a target device. In other embodiments, the configuration step may include the manufacturer configuring and/or programming the remote control device to be capable of performing particular sets of operations and functions. For example, the remote control device may be configured to store in memory a device configuration software application. The application may provide the user with a device configuration interface that may include a series of menus, sub-interfaces, or other options for configuring the remote control device, or in some instances the target device. The device configuration interface may be presented on a display included in the remote control device. In other embodiments, the user may access the device configuration interface via display device 112, which may operatively connected to and/or in communication with the target device or some other computer device (e.g., gateway 111).

At step 321, the remote control device may detect an IR command key-press. One or more buttons on the remote control device may be configured to transmit IR communication data (e.g., and IR command) to a target device. The remote control device may be configured to detect which of these one or more buttons have been pressed (or actuated) by a user. Additionally, the one or more buttons on the remote control device configured to transmit IR communication data may be further configured to transmit IR codes (e.g., an auto-pairing IR ghost code) to a target device when pressed. In some embodiments, the remote control device may be configured at the time of manufacture to be in an auto-pairing mode, such that the remote control device, when first utilized by the user, may transmit auto-pairing IR ghost codes to a desired target device upon an initial key-press by the user. For example, after purchasing and/or receiving a remote control device from a manufacturer, the user may press any number of buttons on the remote control device to begin operating a target device. These one or more button presses may cause the IR transmitter of the remote control device to transmit an auto-pairing IR ghost code to the target device. For example, the remote control device may be configured to transmit IR communication data upon the user actuating the power button (or some other button(s)).

By allowing any number of buttons (or sequences of buttons) on the remote control device to initiate the transmission of the auto-pairing IR ghost code(s) to a target device, the user is seemingly unaware of this transmission and the start of the pairing process. Configuring the remote control device to transmit the auto-pairing IR ghost codes upon the key-press of any button further leverages typical user behavior in pointing the remote control device at a desired target device to power-on (or transmit signals to) the target device. A pairing relationship may be established after the auto-pairing IR ghost codes are transmitted to the target device. In some embodiments, the remote control device may be configured to first transmit an auto-pairing IR ghost code in response to a key-press, and then to send the command signal corresponding to the key-press. In other embodiments, the remote control device may be configured to transmit an auto-pairing IR ghost code after the release of a key-press.

In some example embodiments, a particular button (or subset of buttons) on the remote control may initiate the transmission of an auto-pairing IR ghost code(s) to a target device. For example, the remote control device may have an "auto-pair" button which may be configured to cause the remote control device to transmit an auto-pairing IR ghost code(s). Additionally, or alternatively, the user may press the "Menu" button to initiate the transmission of an auto-pairing IR ghost code(s). In some embodiments, the user may have the option of identifying the particular buttons that may initiate the transmission of an auto-pairing IR ghost code(s) to a target device. In one of these embodiments, a user interface may be provided to the user on a display operatively connected to the remote control device. For example, the remote control device may include a display. As another example, as noted above, a device configuration interface may be provided to the user on a display device (e.g., display device 112). In some aspects of the present disclosure, the user may identify via the device configuration interface the one or more buttons on the remote control device that may trigger the transmission of an auto-pairing IR ghost code. For example, the interface may prompt the user to actuate the one or more buttons on the remote control device that will trigger the transmission of an auto-pairing IR ghost code.

In other embodiments, the remote control device may transmit other communication data to the target device, such as one or more parameters utilized during the automatic pairing process. In some of these embodiments, as will be explained in more detail below with respect to step 327, the remote control device may transmit such information to the target device via an RF communication (e.g., an auto-pairing discovery request). For example, as discussed above in reference to step 305, the remote control device may transmit data or parameters indicating a threshold duration of a pairing time window for the target device.

At step 322, the remote control device may begin a loop where it continues to monitor detected key-presses for a key-press that corresponds to the transmittal of an auto-pairing IR ghost code. As illustrated in FIG. 3B, the remote control device may continue to monitor detect IR command key-presses until it detects a key-press that initiates the transmittal of an auto-pairing IR ghost code. If the remote control device determines that an auto-pairing IR ghost code should be transmitted in response to a detected key-press, the method may proceed to step 323. At step 323, the remote control device may transmit IR communication data (e.g., an IR command and/or IR ghost codes) to a target device, such as gateway 111. The remote control device may transmit the communication data to the target device via a transmission device, such as an IR transmitter. As will be appreciated, the transmission device included in the remote control device may not be limited to an IR transmitter, but may comprise a number of transmission devices, such as a visible light transmitter, a laser transmitter, or any other suitable transmission device capable of transmitting data to a target device.

The transmitted communication data may include IR codes (e.g., auto-pairing IR ghost codes), and other information identifying the remote control device. In one embodiment, the remote control device may transmit a plurality of auto-pairing IR ghost codes to a target device rather than a single auto-pairing IR ghost code to allow the target device to differentiate between different auto-pairing IR ghost codes transmitted by different remote control devices. In some embodiments, the remote control device may transmit one auto-pairing IR ghost code with a random data payload. In other embodiments, the remote control device may transmit a block of auto-pairing IR ghost codes (e.g., a block of 32 different ghost codes). The remote control device may be configured to select one auto-pairing IR ghost code from the plurality of ghost codes to transmit.

At step 324, the remote control device may initiate an auto-pairing time window. The auto-pairing time window (e.g., pairing time window) initiated by the remote control device may correspond to a predetermined time period in which the remote control device may wait to receive a response, from a target device, to the auto-pairing IR ghost code transmitted during step 323. In some embodiments, during step 324, the remote control device may start a timer (or clock) lasting the duration of the pairing time window. In some aspects of the disclosure herein the duration of the pairing time window for the remote control device may be the same as the duration of the pairing time window initiated by the target device, as discussed above with reference to step 305.

In some example embodiments, for the duration of the pairing time window, the remote control device may initiate a "blackout" period (or enter a "blackout" mode) where the remote control device may no longer transmit auto-pairing IR ghost codes and/or auto-pairing discovery requests to target devices. During the blackout period, the remote control device may be configured to transmit standard IR codes to target devices, but not auto-pairing IR ghost codes and/or auto-pairing discovery requests. The remote control device may initiate the blackout period to allow an auto-pairing discovery operation with a target device sufficient time to be completed, as well as to reduce potential latency experienced by the user before attempting to initiate another auto-pairing discovery operation. The remote control device may remain in the "blackout" period for the duration of the pairing time window. As discussed above, during the auto-pairing time window, the remote control device may adjust one or more operational modes. For example, the remote control device may enter a "blackout" mode where the remote control device is configured to not transmit IR codes (e.g., auto-pairing IR ghost codes) and/or auto-pairing discovery requests to target devices. During the blackout period, or when in the blackout mode, the remote control device may still transmit standard IR command signals to one or more target devices.

At step 325, the remote control device may determine whether it has received an RF announcement from a target device. As discussed above with respect to step 306 in FIG. 3A, the target device may transmit an RF announcement (or some other response, acknowledgement, etc.) to the remote control device to indicate that the auto-pairing IR ghost code transmitted during step 323 has been received. In some aspects of the disclosure herein, during step 325, the remote control device may determine an RF channel in which to communicate with the target device. For example, the remote control device may monitor various RF channels for pings transmitted by the target device, and may send a response to the target device upon detecting a ping. In embodiments where the target device may not transmit an RF announcement, after initiating the auto-pairing window, the method may skip step 325 and proceed to step 327, where remote control device may transmit an auto-pairing discovery request to the target device.

If the remote control device determines that an RF announcement has not been received, the method may proceed to step 326, where the remote control device may determine whether the pairing time window initiated during step 324 has expired. In some embodiments the remote control device may determine whether a flag (or some other indicator) indicating the end of the pairing time window has been set. At step 326, if the remote control device determines that the pairing time window has expired, the method may proceed back to step 321. However, if the target device determines that the pairing time window has not expired, the method may proceed back to step 325. Referring back to step 325, if the remote control device determines that an RF announcement (or some other response indicating receipt of the auto-pairing IR ghost code at the target device) has been received, the method may proceed to step 327.

At step 327, the remote control device may transmit one or more auto-pairing discovery requests to a target device. The remote control device may transmit the one or more auto-pairing discovery requests to devices via an RF communication or signal. The RF auto-pairing request transmitted by the remote control device may be sent to auto-pairing capable target devices and/or devices that have previously indicated receipt of an auto-pairing ghost code transmitted by the remote control device.

In some aspects of the present disclosure, the auto-pairing discovery request transmitted by the remote control device may also include data and/or parameters corresponding to (or referencing) specific IR codes (e.g., auto-pairing IR ghost code). For example, the remote control device may transmit an auto-pairing discovery request that includes data and/or a parameter referencing the auto-pairing IR ghost code that was transmitted during step 323. The target device may process the auto-pairing discovery request and the parameters and/or data included therein to determine if the remote control device that transmitted the auto-pairing discovery request is also a device that may have previously transmitted an auto-pairing IR ghost code to the target device. For example, the target device may compare parameters and/or data included in the auto-pairing discovery request to determine if the same remote control device that transmitted the auto-pairing IR ghost code during step 323. The remote control device may utilize the auto-pairing discovery request during the discovery and/or pairing process to identify the one or more target devices that it may attempt to automatically pair with. In some embodiments, the auto-pairing discovery request transmitted by the remote control device may include device specific information, such as information identifying a model or type of the remote control device.

At step 328, the remote control device may initiate a loop where it begins to listen for a discovery response (e.g., auto-pairing discovery response) transmitted by a target device. In some embodiments, the remote control device may monitor one or more frequency bands until an auto-pairing discovery response is received. In other embodiments, during step 328, the remote control device may determine whether the auto-pairing window has expired. In some aspects of the present disclosure, the remote control device may adjust operational modes (e.g., transition from the auto-pairing mode to a standard IR mode) after not receiving an auto-pairing discovery response within a threshold period of time. For example, if the remote control device does not receive an auto-pairing discovery response within 5 minutes of transmitting the auto-pairing discovery request, the remote control device may enter into a standard IR mode. The remote control device may wait any suitable threshold time period to receive an auto-pairing discovery response before adjusting operational modes. As another example, if the remote control device does not receive an auto-pairing discovery response prior to the expiration of the pairing time window the remote control device may enter into a standard IR mode. The remote control device may still be configured to transmit IR codes (e.g., auto-pairing IR ghost codes) while in the standard IR mode, and may output for display on a display device a notification that the remote control device is no longer in the auto-pairing mode. In other embodiments, the remote control device may enter an RF mode, and may attempt to pair with the target device via RF transmissions. Additionally or alternatively, the remote control device may output for display on a display device a notification that the user may manually pair the remote control device with the target device.

The remote control device may be configured to detect whether it has previously or is already paired with a particular target device based on information received from the target device in one or more auto-pairing discovery responses. Additionally, the remote control device may be configured to determine whether the remote control device has yet to pair with a particular target device. For example, a first user may utilize a first remote control device to operate a first STB in a first room of a home, and then unintentionally move the first remote control device to another room in the home where a second STB is located. A second user may unknowingly attempt to use the first remote control device to operate the second STB. In this example, the first remote control device may determine that it has yet to pair with the second STB based on data or identification parameters received in an auto-pairing discovery response transmitted by the second STB. The first remote control device may notify the second user, via a display on the remote control device (or on the second STB), that the first remote control device is not paired with the second STB. In some example embodiments, a notification may also prompt the second user to begin an automatic (or manual) pairing process for the second STB and the first remote control device. In some embodiments, the notification may also display to the user a unique identifier and/or name associated with the second target device. Additionally or alternatively, when the remote control device is exchanging data with the second STB, additional information may be exchanged for purposes of authentication, such as account numbers or a phone number associated with an account, such that the remote control device does not attempt to pair with an STB associated with a different account.

Referring back to step 328, if the remote control device determines that an auto-pairing discovery response has been received, the method may proceed to step 329, where the remote control device may determine whether to perform one or more actions in response to receiving the auto-pairing discovery response. The remote control device may contain business logic, algorithms, or other instructions for determining whether it should perform one or more specified actions in response to receiving the auto-pairing discovery response transmitted from a target device. For example, if the target device receives auto-pairing discovery responses from multiple target devices, the remote control device may be configured to not accept the auto-pairing discovery responses. Additionally or alternatively, the remote control device may be configured to not pair with the target devices responding to the auto-pairing discovery request transmitted during step 327. There are various ways in which the target device may determine if received auto-pairing discovery responses were sent from multiple target devices. For example, the remote control device may extract device-specific information (e.g., model, device type, MAC address, RSSI, other unique identifiers, etc.) from each received auto-pairing discovery response, and compare such information to determine whether the auto-pairing discovery response(s) were sent from multiple target devices.

As another example, the remote control device may determine whether a predetermined number of consecutive successful auto-pairing discovery operations have occurred (or have been attempted) before taking action in response to the auto-pairing discovery response received during step 328. As discussed above, the remote control device may need to complete a certain number of successful auto-pairing discovery operations to ensure that the remote control device has identified the appropriate (or correct) target device to pair with. For example, the remote control device may need to undergo three (3) consecutive successful auto-pairing discovery operations before the target device may initiate a pairing and validation process with the remote control device. After determining that a predetermined number of consecutive successful auto-pairing discovery operations have occurred (or have been attempted), as will be discussed in more detail below, the remote control device may begin a pairing process and validation process with the target device.

In some embodiments, the consecutive successful auto-pairing discovery operations may occur without the remote control device receiving an auto-pairing discovery response from another target device (e.g. a different target device than the target device that transmitted the auto-pairing discovery response received during step 328). In some embodiments, the remote control device may retrieve from memory one or more configurable parameters indicating the number of consecutive successful auto-pairing discovery operations necessary before auto-pairing with a particular target device. In some embodiments, the remote control device may be configured (or programmed) at the time of manufacture with the parameters indicating the number of consecutive successful auto-pairing discovery operations for a particular target device. The remote control device may be programmed with other configurable parameters, such as the number of consecutive button key-presses on the remote control device to indicate a certain level of customer frustration, the number of consecutive button presses on the remote control device before adjusting an operational mode of the remote control device, the number of button key-presses on the remote control device before the remote control attempts to determine if it is still paired with a particular target device, and any other reconfigurable parameters associated with the remote control device. In some of these embodiments, the remote control device may receive information from a target device adjusting one or more parameters of the remote control device.

In other embodiments, a target device may transmit data to the remote control device, for example in a discovery response (e.g., an auto-pairing discovery response), indicating a number of consecutive successful auto-pairing discovery operations that may occur (or be attempted) before attempting to initiate a pairing process and validation process. In other embodiments, the remote control device may increment a counter for each consecutive successful auto-pairing discovery operation completed between the remote control device and target device, and may compare the value of the counter to one or more of the parameters discussed above. In some aspects of the present disclosure, the remote control device may track whether an auto-pairing discovery operation has succeeded or failed. In some example embodiments, during step 329, the remote control device may update a counter indicating whether a discovery operation has failed (e.g., the target device does not respond to a transmitted auto-pairing discovery request). Additionally or alternatively, the remote control device may update a counter indicating whether a discovery operation has succeeded.

At step 329, if the remote control device determines not to accept or respond to the auto-pairing discovery response received during step 328, the method may proceed to step 330, where the remote control device may determine whether to continue attempts to auto-pair with a target device. In some embodiments, during step 330, the target device may determine whether a predetermined number of unsuccessful auto-pairing discovery operations have occurred (or have been attempted). As discussed above, the remote control device may be configured to associate the receipt of auto-pairing discovery responses from multiple target devices as an unsuccessful auto-pairing discovery operation. In other embodiments, during step 330, the target device may determine whether a predetermined number of consecutive unsuccessful auto-pairing discovery operations have occurred (or have been attempted).

In the event that the target device determines a predetermined number of unsuccessful auto-pairing discovery operations have occurred (or have been attempted), the remote control device may be considered not able to complete the auto-pairing process with that target device. For example, if the remote control device has attempted five (5) auto-pairing discovery operations, each resulting in the remote control device failing to complete the auto-pairing discovery operation, the remote control device may determine that it cannot complete the auto-pairing process and may take appropriate corrective measures, such as adjusting an operational mode of the remote control device or transmitting a denial message. The predetermined number of unsuccessful auto-pairing discovery operations attempted by the remote control device may be 3 attempts, 5 attempts, 7 attempts, or any other suitable number of attempts. The remote control device may retrieve from memory the predetermined number of unsuccessful auto-pairing discovery operations to attempt before taking appropriate (or corrective) action. In some embodiments, the remote control device may receive data or parameters from a target device indicating a number of unsuccessful auto-pairing discovery operations to attempt before taking appropriate action. In other embodiments, the remote control device may be programmed at the time of manufacture with data or parameters indicating a number of unsuccessful auto-pairing discovery operations to attempt before taking appropriate (or corrective) measures.

Referring back to step 330, if the remote control device determines it should continue attempting to auto-pair with a target device, the method may proceed back to step 321. For example, if the target device determines that a predetermined number of unsuccessful auto-pairing discovery operations have not occurred (or have not been attempted), the method may proceed to step 321. However, if the remote control device determines not to continue its attempts to auto-pair with a target device, the method may proceed to step 331.

At step 331, the remote control device may take one or more corrective measures in response to determining not to continue auto-pairing attempts with a target device (e.g., determining that it has failed a predetermined number of consecutive auto-pairing discovery operations with a target device). In one example embodiment, during step 331, the target device may output for display on a display device a notification that the remote control device has failed to auto-pair with a target device. In other example embodiments, during step 331, the remote control device may adjust one or more operational modes. For example, the remote control device may transition out of an auto-pairing mode into a standard IR mode, such that the user of the remote control device may manually pair the remote control device with a desired target device. In embodiments where the remote control device may attempt to retransmit auto-pairing IR ghost codes to a target device after not receiving an auto-pairing discovery response within a threshold time period, the periodic retransmission of data (e.g., auto-pairing IR ghost codes) to target devices can consume a large portion of the remote control device's power or batter supply. By switching from an auto-pair mode to a standard IR mode, the remote control device may conserve its power or battery supply, thus providing improved and more efficient power management.

The remote control device may still be configured to transmit IR codes (e.g., auto-pairing IR ghost codes) while in the standard IR mode. The auto-pairing IR ghost codes transmitted to a target device while the remote control device is in the standard IR mode may cause the target device to output for display on a display device a notification that the remote control device is no longer in the auto-pairing mode and/or that the user may manually pair the remote control device with the target device. In embodiments, where the remote control device includes a display, a notification may be displayed on remote control display indicating that the remote control device has adjusted operational modes. In some embodiments, the remote control device may enter an RF pairing mode, and may attempt to pair with the target device via RF transmissions. In other embodiments, the user may receive a prompt providing instructions for manually pairing the remote control device with a target device. In other aspects of the disclosure herein, during step 331, the remote control device may initiate a "blackout" period where the remote control device no longer transmits IR codes (e.g., auto-pairing IR ghost codes) or auto-pairing discovery requests to target devices. As discussed above, the remote control device may initiate the "blackout" period to reduce potential latency experienced by the user before attempting to initiate another auto-pairing discovery operation.

In some aspects of the present disclosure, the remote control device may transition back to an auto-pairing mode after receiving an auto-pairing discovery response from a target device. In one of these embodiments, the remote control device may transition back to the auto-pairing mode after receiving an auto-pairing discovery response from a target device within a threshold period of time after adjusting operational modes. At step 332, the remote control device may be manually paired with a desired target device using known pairing and validation methods.

Referring back to step 329, if the remote control device determines that it should take action in response to receiving the auto-pairing discovery response, the method may proceed to step 333 where the remote control device may automatically attempt to pair with the target device that transmitted the auto-pairing discovery response received during step 328. At step 333, the remote control device may attempt to establish a pairing relationship, using known pairing and validation methods, with the target device that transmitted the auto-pairing discovery-response received during step 328.

At step 334, after the pairing and validation process has been completed, the remote control device may disable its IR transmitter and communicate with the paired target device via RF communication. Disabling IR capability on the remote control device may result in increased power efficiency and savings. In some embodiments, when an auto-pairing IR ghost code is sent, the remote control device may cause its RF receiver (e.g., radio) to remain powered-on for a predetermined period of time, such that the remote control device may receive a response or acknowledgement from a target device.

Additionally or alternatively, after the pairing process has been completed, the remote control device may provide additional features and/or functions based on data exchanged via RF between the remote control device and the target device. For example, the remote control device may be equipped with an actuator that outputs a force to provide a haptic sensation or feedback to the user contacting the remote control device. The haptic feedback on the remote control device may be based on one or more events occurring at the target device. For example, when the target device adjusts operational modes, a RF signal may be transmitted from the target device to the remote control device to initiate the actuator. In yet additional embodiments, the target device may transmit data to the remote control device to initiate other functions on the remote control device, such as causing one or more light emitting diodes (LEDs) on the remote control device to turn-on. The target device may cause particular LEDs or a series of LEDs to turn on, which may notify the user of a status of the target device.

In other embodiments, the RF pairing between the remote control device and the target device may permit the user to control the target device via voice-controls. The remote control device may include added capabilities or features for exchanging data or voice and control signals (via RF) with the target device. For example, the remote control device may be equipped with a voice recognizer that determines voice commands from the user, and sends back control signals to affect the control of the target device.

At step 335, the remote control device may determine whether it needs to end a pairing relationship with a target device. In some embodiments, the remote control device may be configured to maintain pairing relationships with a predetermined number of target devices. If the pairing relationship created during step 333 causes the remote control device to exceed a threshold number of pairing relationships, the remote control device may terminate a pairing relationship with one or more target devices. If the remote control device determines no pairing relationships need to be terminated, the method may proceed back to step 321. If the remote control device determines that one or more pairing relationships need to be terminated, the method may proceed to step 336, where the remote control device may terminate a pairing relationship with one or more target devices. During step 336, in some embodiments, the remote control device may output to a display a message indicating that a pairing relationship with a target device has been terminated. After the one or more target devices have been un-paired (e.g., the pairing relationship with the target device has been terminated), the method may proceed back to step 321.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present disclosure in various embodiments and with various modifications as are suited to the particular use contemplated. All embodiments need not necessarily achieve all objects or advantages identified above. Any and all permutations of various features described herein are within the scope of the present disclosure.

We claim:

1. A method comprising:

determining, by a first device, a first identifier associated with a second device in communication with the first device;

comparing the first identifier with an ordered list of identification codes that are associated with a plurality of manufacturers, wherein different identification codes within the ordered list correspond to different quantities of testing used to verify each of the different identification codes; and causing pairing, based on an association between the first identifier and a second identifier in the ordered list of identification codes, of a remote control and the first device.

2. The method of claim 1, further comprising:

prior to the determining the first identifier, determining, by the first device, an amount of time required for the remote control to respond to a command, wherein the causing pairing is further based on the amount of time.

3. The method of claim 1, further comprising:

determining, before the determining the first identifier and based on a plurality of commands sent from the remote control to the first device, one or more commands, of the plurality of commands, that are supported by the remote control.

4. The method of claim 1, further comprising:

determining a plurality of testing procedures corresponding to the ordered list; and determining, for the remote control and based on an order of the second identifier within the ordered list, a testing procedure from the plurality of testing procedures.

5. The method of claim 1, wherein the causing pairing comprises:

prompting a user to perform a quantity of testing of the remote control, wherein the quantity of testing is based on an order of the second identifier within the ordered list.

6. The method of claim 1, wherein the causing pairing comprises:

verifying the first identifier by causing the remote control to send a plurality of commands to the first device, wherein the plurality of commands is based on an order of the second identifier within the ordered list.

7. The method of claim 1, further comprising:

receiving, from the remote control, a list of identification codes; and generating the ordered list of identification codes based on a geographic location of each manufacturer associated with each identification code in the list of identification codes.

8. The method of claim 1, wherein the ordered list is based on identification codes received from the remote control.

9. The method of claim 1, wherein the ordered list indicates, based on popularity levels of manufacturers associated with the identification codes, different quantities of command testing.

10. A method comprising:

receiving, by a first device and from a remote control, a list of manufacturer codes;

ordering, by the first device, the list of manufacturer codes to create an ordered list of manufacturer codes;

determining, by the first device, a first identifier associated with a second device in communication with the first device;

determining, based on a position of the first identifier within the ordered list of manufacturer codes, a quantity of testing to perform with the remote control; and causing pairing, based on the quantity of testing, of the remote control and the first device.

11. The method of claim 10, further comprising:

prior to determining the first identifier, determining, by the first device, an amount of time required for the remote control to respond to a command, wherein the causing pairing is further based on the amount of time.

12. The method of claim 10, wherein the first device comprises a set-top box and the second device comprises a display device.

13. The method of claim 10, wherein different manufacturer codes within the ordered list correspond to different quantities of testing used to verify each of the different manufacturer codes.

14. The method of claim 10, wherein the ordering comprises ordering, based on a popularity of each manufacturer associated with each manufacturer code within the list of manufacturer codes.

15. A method comprising:

determining, by a first device, an identifier associated with a manufacturer of a second device that is in communication with the first device;

determining, based on the identifier and data indicating different quantities of testing for different manufacturers, a quantity of testing corresponding to the second device; and causing pairing, based on the quantity of testing, of a remote control and the first device.

16. The method of claim 15, wherein the first device comprises a gateway device and the second device comprises a display device.

17. The method of claim 15, further comprising: verifying the identifier by causing the remote control to send a plurality of commands to the first device, wherein the plurality of commands is based on the quantity of testing.

18. The method of claim 15, further comprising:

prior to determining the identifier, determining, by the first device, an amount of time required for the remote control to respond to a command, wherein the causing pairing is further based on the amount of time.

19. The method of claim 15, wherein the quantity of testing is based on one of a geographic location or size of the manufacturer of the second device.

20. The method of claim 15, wherein the data comprises an ordered list, and wherein a position within the ordered list indicates the quantity of testing.

* * * * *